United States Patent [19]

Bagnulo

[11] Patent Number: 4,496,444
[45] Date of Patent: Jan. 29, 1985

[54] METHOD OF CORROSION PROTECTION

[75] Inventor: Luigi Bagnulo, Milan, Italy

[73] Assignee: Caunned Aktiengesellschaft, Liechtenstein, Liechtenstein

[21] Appl. No.: 222,757

[22] Filed: Jan. 5, 1981

Related U.S. Application Data

[60] Division of Ser. No. 793,870, May 4, 1977, abandoned, which is a continuation of Ser. No. 619,777, Oct. 6, 1975, abandoned, which is a continuation of Ser. No. 459,685, Apr. 10, 1974, abandoned.

[30] Foreign Application Priority Data

Apr. 19, 1973 [IT] Italy ............................. 23191 A/73
Feb. 11, 1974 [IT] Italy ............................. 20367 A/74

[51] Int. Cl.³ ............................................. C23F 13/00
[52] U.S. Cl. ................................... 204/148; 204/197; 428/40; 428/447; 428/457
[58] Field of Search ...................... 204/148, 196, 197

[56] References Cited

U.S. PATENT DOCUMENTS

| | | | |
|---|---|---|---|
| 801,489 | 10/1905 | Uthemann | 204/197 X |
| 2,498,493 | 2/1950 | Hickernell | 427/121 X |
| 2,808,213 | 10/1957 | Coleman et al. | 117/227 |
| 3,202,596 | 8/1965 | Canevari | 204/148 |
| 3,260,661 | 7/1966 | Kemp et al. | 204/148 |
| 3,311,696 | 3/1967 | Melnick | 428/344 X |
| 3,332,867 | 7/1967 | Miller et al. | 204/197 |
| 3,475,213 | 10/1969 | Stow | 427/207 B |
| 3,505,144 | 4/1970 | Kilduff et al. | 428/344 X |
| 3,558,463 | 1/1971 | Strobach et al. | 204/197 |
| 3,623,968 | 11/1971 | Bohne | 204/197 |

Primary Examiner—G. L. Kaplan
Attorney, Agent, or Firm—Michael J. Striker

[57] ABSTRACT

An anode for the cathodic protection of a metallic structure subject to corrosion includes a strip or band of aluminum, zinc, magnesium or alloys thereof. The strip or band is anodic to the metallic structure and has a surface which is adapted to face the metallic structure. This surface of the strip or band is provided with a layer of electrically conductive adhesive so as to permit the strip or band to be adhesively secured to the metallic structure and to be in electrical communication therewith. In this manner, metallic structures of any arbitrary configuration may be cathodically protected under all corrosive conditions.

22 Claims, 3 Drawing Figures

METHOD OF CORROSION PROTECTION

This application is a division of application Ser. No. 793,870, filed May 4, 1977, which in turn was a continuation of application Ser. No. 619,777, filed Oct. 6, 1975, which in turn was a continuation of application Ser. No. 459,685, filed Apr. 10, 1974 and all now abandoned.

BACKGROUND OF THE INVENTION

The invention relates generally to the phenomenon of corrosion and, more particularly, to the protection of metallic structures or surfaces which are subjected to corrosive conditions. Of special interest is the cathodic protection of such metallic structures or surfaces.

It is known that all metallic structures which come into contact with a liquid having the properties of an electrolyte are susceptible to the phenomenon of spontaneous corrosion. Such corrosion tends to destroy the metallic structure and, depending upon the particular corrosive conditions existing, destruction of the metallic structure may occur within a longer or shorter period of time. In many instances, however, significant damage to the metallic structure may occur within a short period of time even though destruction of the metallic structure has not yet occurred.

Some examples of metallic structures which are prone to the phenomenon of spontaneous corrosion are as follows: radiating panels embedded in floor concrete; metallic pipes embedded in or passing through masonry; and standing, fixedly mounted metallic piles. All of these metallic structures may come into contact with water or some other electrolyte. Moreover, metallic structures which are exposed to the atmosphere are also susceptible to spontaneous corrosion. For instance, eaves, gutters, motor vehicle parts, the rolling gates commonly used for locking shops, etc. are all subject to this phenomenon.

It is also well known that corrosion phenomena become intensified with increasing chemico-physical variations along the metallic structure, whether these chemico-physical variations are due to variations in the metallic surface or due to variations in the electrolyte wetting the metallic surface or due to variations in both the metallic surface and the electrolyte. The reason is that such chemico-physical variations produce electrochemical systems and electrical fields which enhance the corrosion and permit its continued progression.

It is further known that the action of such electrochemical systems and electrical fields may be nullified by simply creating electrical fields which oppose those due to the chemico-physical variations and buck those fields. One manner of achieving this is by the use of so-called "sacrificial" anodes which go into solution in the electrolyte more readily than the metallic surfaces which are to be protected. The anodes are electrically connected to the metallic surface which is to be protected from corrosion by means of a cable and are then immersed in the electrolyte. In this manner, the anodes set up electrical fields opposing those due to the chemico-physical variations thereby protecting the metallic structure from corrosion. The protection of metallic surfaces from corrosion by using anodes which are in electrical communication with the metallic surfaces and which are immersed in the same electrolyte as the metallic surfaces may be referred to as "cathodic protection" of the metallic surfaces.

However, there are many instances where cathodic protection, when carried out in the conventional and well-known manners used heretofore, cannot be utilized. This would be the case, for example, with motor vehicle parts, particularly the lower zones of doors and fenders, radiating panels and, in general, pipes which are embedded in or pass through concrete, masonry or the like, the lower edges of rolling gates, eaves, gutters, etc. The fact that cathodic protection cannot be utilized in many instances is due to the impossibility of creating the necessary protective fields under many circumstances, one of the reasons for this being that the electrolyte is often discontinuous so that the electrolytic connection between anode and surface to be protected, which is essential for the functioning of cathodic protection, is lacking.

SUMMARY OF THE INVENTION

It is, therefore, a general object of the invention to eliminate the above-outlined restrictions on the applicability of cathodic protection.

Another object of the invention is to provide a sacrificial anode for the cathodic protection of structures which permits cathodic protection of structures under all conditions of corrosion to be realized.

An additional object of the invention is to provide a sacrificial anode for the cathodic protection of structures which is capable of providing cathodic protection for structures of any arbitrary configuration.

A further object of the invention is to provide a sacrificial anode for the cathodic protection of structures which is simple to construct and inexpensive to manufacture.

It is also an object of the invention to provide a sacrificial anode for the cathodic protection of structures which is convenient to store and transport.

In pursuance of the foregoing objects, and of others which will become apparent, the invention provides a sacrificial anode for the cathodic protection of a metallic surface subject to corrosion, said anode having a surface adapted to face the metallic surface. A layer of adhesive is provided on this surface of the anode so as to permit the latter to be adhesively secured to the metallic surface. This permits cathodic protection of the metallic surface by the anode under all corrosive conditions.

It will be appreciated that the invention is suitable for effecting cathodic protection of metallic structures of any kind which are susceptible to or subject to corrosion such as, for instance, the phenomenon of spontaneous corrosion. Moreover, it may be seen that the invention is suitable for effecting cathodic protection of a metallic structure regardless of the ambient situation in which the structure may be found. In particular, the invention is of great advantage when it is physically impossible to make use of the well known systems of cathodic protection utilized heretofore because of the discontinuity of the electrolyte which affects the metallic surface or because the electrolyte has a small thickness along the metallic surface. Under these conditions, the conventional systems of cathodic protection are unable to create protective fields which are of sufficient extent to protect the entire metallic surface.

The novel features which are considered as characteristic for the invention are set forth in particular in the appended claims. The invention itself, however, both as to its construction and its method of operation, together with additional objects and advantages thereof, will be best understood from the following description of spe-

DESCRIPTION OF THE PREFERRED EMBODIMENTS

Figure 1:
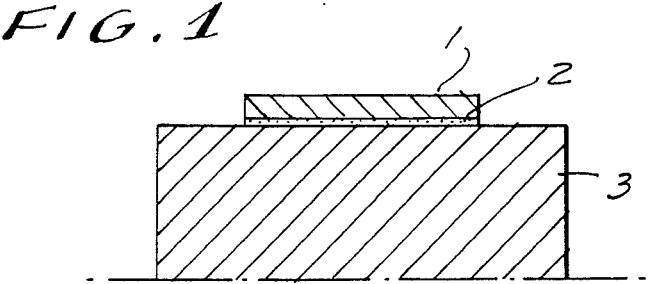
FIG. 1 is a sectional view showing one form of an anode according to the invention adhering to a metallic surface.

Referring first to FIG. 1 of the drawing, an anode according to the invention is shown adhering to a surface of a metallic structure 3. In accordance with the invention, the anode 1, on the surface portion thereof facing the metallic structure 3, is provided with a layer of adhesive 2. The adhesive layer 2 secures the anode 1 to the surface of the metallic structure 3.

The anode in accordance with the invention is a sacrificial anode, that is, an anode having a higher dissolution potential in the electrolyte affecting the metallic structure 3 than the metallic structure 3 itself (or the surface of the metallic structure 3).

In the present instance the metallic surface 3 forms a voltaic couple with the anode 1 and the latter goes into solution in the electrolyte acting upon the metallic surface. The anode 1 may be composed of aluminum, zinc, magnesium, alloys of these metals with one another or other alloys containing these metals. It is of particular advantage when specified percentages of other metals are added to the anode metal so as to improve the anodic properties thereof. However, the anode 1 may comprise any metals or alloys of metals, the primary consideration being that this anode 1 have a higher dissolution potential than that of the metal or metallic substance to be protected. The metal or metallic substance to be protected may be any metal or metallic substance which is susceptible to corrosion, an example being iron or iron-containing materials.

The anode 1 is preferably in the form of a tape, a band or a strip. However, the anode 1 may be a component of any suitable shape or configuration. In either event, it is advantageous for the anode 1 to have a small thickness. The dimensions, such as the length and width, of the anode 1 are chosen so as to be convenient. The dimensions and configuration of the anode 1 should be selected so that the anode may be applied directly to all parts of the metallic surface to be protected and so that the anode may be applied to surfaces of any arbitrary configuration.

Preferably, the adhesive provided on the anode 1 is waterproof, resistant to the action of petroliferous products or hydrocarbons, resistant to chemical action, weather-resistant and heat-resistant. It is also a necessity in accordance with the invention that the adhesive be electrically conductive. The possession of these characteristics by the adhesive makes it particularly feasible to use the anode according to the invention directly on all parts of the metallic surface to be protected. Examples of electrically conductive adhesives are acrylic glues or vinyl glues which have been suitably treated.

The adhesive forming the adhesive layer 2 may be self-adhesive immediately. On the other hand, it is also possible for the adhesive to be present on the surface of the anode 1 in dry form. In the latter event, the adhesive may be activated, that is, made adhesive, by wetting it with a suitable liquid such as, for instance, water, or the adhesive may be activated by heating it or by subjecting it to the action of luminous energy.

If the adhesive which is electrically conductive, is self-adhesive (pressure sensitive), then it has to be covered with a protective covering (releasable sheet material), preferably one which has been suitably treated so as to possess low adhesiveness. If the protective covering has been treated so as to be of low adhesiveness, then strong adhesion between the protective covering and the electrically conductive adhesive is prevented and, in this manner, removal of the protective covering from the adhesive is facilitated. Moreover, by providing a protective covering having low adhesiveness, it becomes possible to wind up or roll up the anode while avoiding strong adhesion between the adjacent windings thereof. The protective covering may be of paper, plastic material or some other suitable protective material. An example of a material which has been treated so as to possess low adhesiveness is silicone-treated paper.

Figure 2:
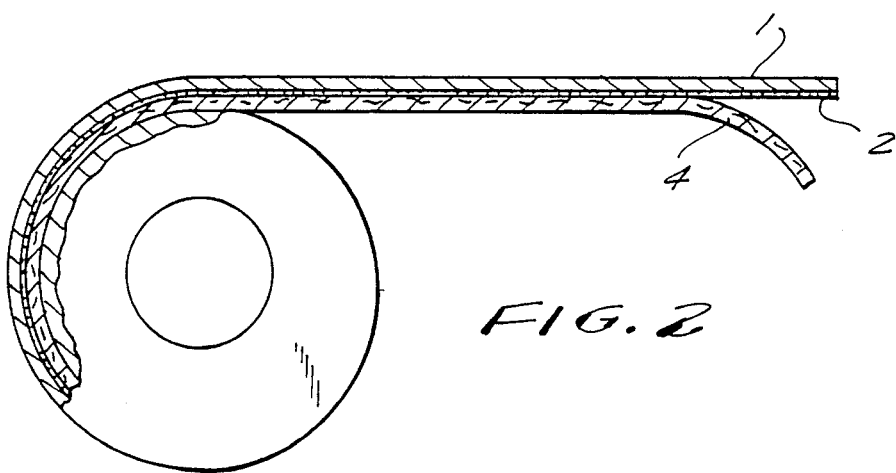
FIG. 2 is a side view, partially in section, showing another embodiment of the invention.

FIG. 2 illustrates the embodiment of the invention where the anode is provided with a protective covering. In FIG. 2, the same reference numerals as in FIG. 1 have been used to designate like components. The protective covering for the adhesive layer 2 is designated with the reference numeral 4 in FIG. 2.

In accordance with the invention, it is also possible to treat that surface portion of the anode 1 which is opposite the surface portion thereof provided with the adhesive layer 2 in suitable manner so as to permit the anode to be rolled up or wound up without adhesion of the adjacent windings of the anode to one another.

Figure 3:
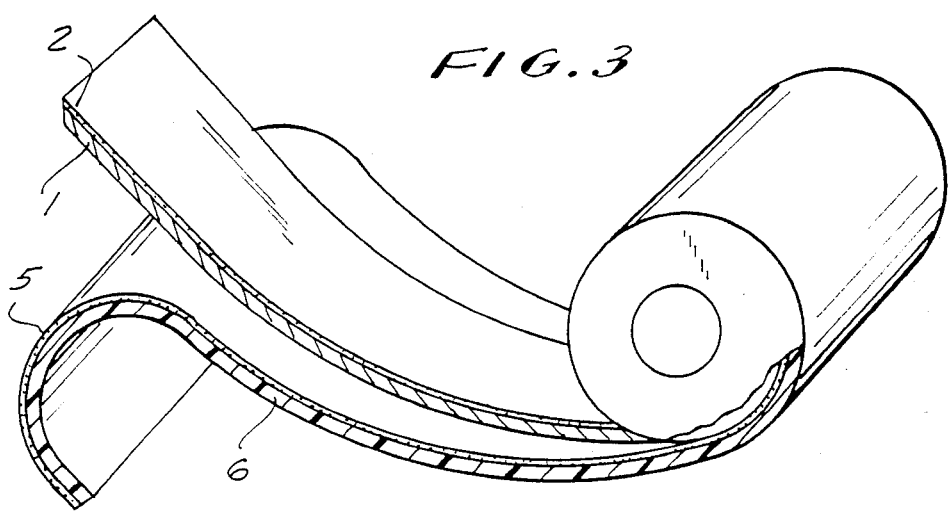
FIG. 3 is a side view, partially in section, showing yet another embodiment of the invention.

According to a further concept of the invention, the surface portion of the anode 1 opposite that surface portion thereof having the adhesive layer 2 thereon may be provided with an insulating material. This is illustrated in FIG. 3 where, again, like reference numerals have been used to designate the same components as in the preceding FIGURES. In the embodiment shown in FIG. 3, a layer 6 of an insulating material is adhesively secured to the anode 1 by means of a layer 5 of adhesive material. The layer 6 of insulating material may be in the form of a tape, a band or a strip, but may also be a component of any suitable shape or configuration. The layer 6 of insulating material may be of any thickness or width and, preferably, has the same dimensions as, or has larger dimensions than, the surface portion of the anode 1 on which it is provided. The insulating material may be a plastic insulating material or any other conventional insulating material.

Thus, in accordance with the invention, it is necessary that the total surface, i.e. the surface portion of the anode 1 and the similarly dimensioned or larger-dimensioned surface of the insulating material, be provided with adhesive which, at least as far as the surface of the anode 1 is concerned, is absolutely electrically conductive.

It will be understood that each of the elements described above, or two or more together, may also find a useful application in other types of constructions differing from the types described above.

While the invention has been illustrated and described as embodied in a protective anode, it is not intended to be limited to the details shown, since various modifications and structural changes may be made therein without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of anticorrosion protection of long steel pipes and other such structures, similar to that afforded by zinc plating, the method comprising the steps of providing an elongated continuous first layer of such corrodible metal as can serve as sacrificial-anode material; arranging on said first layer an elongated continuous second layer of electrically conductive adhesive composition which is adherent to metal surfaces so that said second layer extends along the entire length of, is bonded to and is in electrically conductive surface contact with said first layer over the whole of the facing surfaces of said first and second layers, whereby an elongated flexible anticorrosion tape is produced; and applying the thus-produced anti-corrosion tape at the side of said second layer onto long steel pipes or other such structures by spirally winding or otherwise putting on, so that said second layer and thereby also said first layer extends along the surface of the long steel pipes or other structures, and whereby said second layer and thus said first layer is bonded with, and is in electrically conductive surface contact there with.

2. A method defined in claim 1, wherein said providing and arranging steps include providing and arranging such first and second elongated continuous layers which are of the same width and length and are coextensive with each other.

3. A method defined in claim 2, wherein said providing step includes forming said first layer of such a metal which is composed of aluminum, or zinc, or an alloy of these metals.

4. A method defined in claim 1, wherein said providing step includes forming said first layer of such a metal which is composed of aluminum, or zinc, or an alloy of these metals.

5. A method defined in claim 1; and further comprising the step of arranging an elongated continuous third layer of electrically insulating material so that said first layer is located between said second and third layers, and said third layer being adhesively bonded to said first layer.

6. A method defined in claim 5, wherein said step of arranging said third layer includes arranging said third layer so that it extends along the whole length of the tape and has a width at least equal to the widths of said first and second layers.

7. A method defined in claim 1, wherein said step of arranging said second layer includes forming said second layer of a material which is a pressure-sensitive electrically conductive adhesive material.

8. A method defined in claim 7; and further comprising the step of arranging an elongated continuous layer of release material at least coextensive with and in adhesive surface contact with said second layer.

9. A method defined in claim 8, wherein said steps of providing and arranging said layers includes forming the elongated flexible anticorrosion tape in the form of a wound-up roll which can be unrolled, and peeling the layer of release material from said second layer to permit the unrolled tape to be spirally wound around the entirety of or otherwise applied to a steel pipe or other metallic structure to be protected.

10. A method defined in claim 9, wherein said step of providing said first layer and arranging said second layer include forming said first and second continuous layers of the same width and length and coextensive with each other.

11. A method defined in claim 8, wherein said step of arranging the layer of release material includes using the release material of paper or plastic sheet material.

12. A method defined in claim 8, wherein said step of arranging the layer of release material includes using the release material of silicone-treated paper.

13. A method defined in claim 1, wherein said arranging step includes forming said second layer of the electrically conductive adhesive composition which is resistant to chemical action, hydrocarbons, weathering and heat.

14. A method defined in claim 1, wherein said arranging step includes forming said second layer of the electrically conductive adhesive composition which is a dry substance activatable by heat, luminous energy or wetting with liquid.

15. A method defined in claim 1, wherein said arranging step includes using an acrylic or vinyl glue as the electrically conductive adhesive composition.

16. A method defined in claim 1, wherein said arranging step includes using a water-activatable adhesive as the electrically conductive adhesive composition.

17. A method of anti-corrosion protection of metal structures which have dissolution potentials, comprising the steps of providing a continuous first layer or corrodible metal serving as a sacrificial-anode and having an inwardly facing surface, the metal having a dissolution potential greater than that of a structure which is to be protected; arranging on said first layer a continuous second layer of an electrically conductive adhesive composition which has an inwardly facing surface, the electrically conducted adhesive composition being adherant to metal surfaces and extending along, being bonded to, and being in electrically conductive surface contact with said first layer, such contact existing entirely over inwardly facing surfaces, whereby a flexible anti-corrosion tape is produced; and applying the thus-produced anti-corrosion tape at the side of said second layer onto metal structures so that said second layer and thereby also said first layer extends along the surface of the metal structures, and whereby said second layer and thus said first layer is bonded with, and is in electrically conductive surface contact with the metal structures.

18. A method defined in claim 17, wherein the second layer of said sheet is a pressure-sensitive electrically conductive adhesive material.

19. A method defined in claim 18; and further comprising the step of arranging a continuous layer of release material coextensive with and peelably adhered to the second layer.

20. A method defined in claim 19, wherein said step of arranging a layer of the release material includes using the release material of silicone-treated paper.

21. A method defined in claim 17, wherein said providing step includes using the metal which is zinc.

22. A method defined in claim 17, wherein said providing and arranging steps include producing the sheet which is elongated to form a tape.

* * * * *